(12) United States Patent
Mehdizade et al.

(10) Patent No.: US 10,672,206 B2
(45) Date of Patent: Jun. 2, 2020

(54) SYSTEMS, METHODS AND APPARATUSES FOR DIAGNOSTIC FAULT DETECTION BY PARAMETER DATA USING A REDUNDANT PROCESSOR ARCHITECTURE

(71) Applicant: GM GLOBAL TECHNOLOGY OPERATIONS LLC, Detroit, MI (US)

(72) Inventors: Mohsen Mehdizade, Toronto (CA); Gurmitsingh M. Banvait, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 380 days.

(21) Appl. No.: 15/837,097

(22) Filed: Dec. 11, 2017

(65) Prior Publication Data
US 2019/0180526 A1    Jun. 13, 2019

(51) Int. Cl.
G07C 5/08 (2006.01)
G07C 5/00 (2006.01)
G05D 1/00 (2006.01)

(52) U.S. Cl.
CPC ......... *G07C 5/0808* (2013.01); *G05D 1/0088* (2013.01); *G07C 5/008* (2013.01); *G07C 5/085* (2013.01); *G07C 5/0816* (2013.01)

(58) Field of Classification Search
CPC ...... G07C 5/0808; G07C 5/008; G07C 5/085; G07C 5/0816; G05D 1/0088; G05D 1/0077
See application file for complete search history.

(56) References Cited

U.S. PATENT DOCUMENTS

| | | | |
|---|---|---|---|
| 8,417,990 B2* | 4/2013 | Ohkawa | G06F 11/188 700/79 |
| 10,397,019 B2* | 8/2019 | Hartung | G05D 1/0077 |

* cited by examiner

Primary Examiner — Michael J Zanelli
(74) Attorney, Agent, or Firm — Lorenz & Kopf LLP (57) ABSTRACT

Systems, methods and apparatuses are provided for detecting faults. The system includes a fault diagnostic computer in an autonomous vehicle configured to, via at least a first platform and a second platform, receive parameter data for processing simultaneously the parameter data in each platform wherein the first and second platforms are redundant configurations of each other wherein the parameter data includes a characteristic of a data; a check platform, coupled to the first and second platforms, for performing a method for checking the parameter data processed by both platforms using a collision test, the method includes: detecting, by applications of the collision test to one or more corresponding data found on each platform, collisions of the data within a tolerance prescribed by the collision test; and determining faults, in either the first platform, the second platform or both, based on results of comparisons of parameter data of the detected collisions.

20 Claims, 8 Drawing Sheets

Collision Detection Test with inputs from the same computing platform — 525

| HW Accelerator 1 State (Environment 1) | Healthy | Failed |
|---|---|---|
| CPU1 State (Path 1) | Healthy | Healthy |
| Collision Detection Test Result | Collision Free | Collision Free |

Collision Detection Test with inputs from the same computing platform is not capable of detecting HW Accelerator failures

FIG. 5B

Collision Detection Test Results — 540

| Inputs of Collision Detection Test | Collision Free | Collision Detected |
|---|---|---|
| Path 1 (output of CPU1) vs Environment1 (output of HW Accelerator 1) | | |
| Fault Isolation | Hardware Accelerator might be Healthy or Faulty | CPU1 |

| Inputs of Collision Detection Test | Collision Detection Test Results | | | | | | | |
|---|---|---|---|---|---|---|---|---|
| Path 1 vs Environment 1 | Collision Free | Collision Free | Collision Detected | Collision Free | Collision Free | Collision Free | Collision Free | Collision Detected |
| Path 2 vs Environment 1 | Collision Free | Collision Detected | Collision Detected | Collision Detected | Collision Free | Collision Free | Collision Free | Collision Detected |
| Path 2 vs Environment 2 | Collision Free | Collision Free | Collision Free | Collision Detected | X (Don't Care) | X (Don't Care) | Collision Detected | X (Don't Care) |
| Path 1 vs Environment 2 | Collision Free | X (Don't Care) | X (Don't Care) | Collision Free | Collision Detected | Collision Detected | X (Don't Care) | X (Don't Care) |
| Active Platform | 1 | 2 | None | 1 | None | None | None | None |
| Fault Isolation | None | CPU1 | CPU1 (HW Accelerator 1 or HW Accelerator 2) | CPU2 | CPU2 (HW Accelerator 1 or HW Accelerator 2) | HW Accelerator 1 or HW Accelerator 2 | HW Accelerator 1 or HW Accelerator 2 | CPU1 and CPU2 |

SYSTEMS, METHODS AND APPARATUSES FOR DIAGNOSTIC FAULT DETECTION BY PARAMETER DATA USING A REDUNDANT PROCESSOR ARCHITECTURE

INTRODUCTION

The present disclosure generally relates to systems, methods and apparatuses for diagnostic fault detections, and more particularly relates to diagnostic systems, methods and apparatuses for detecting and determining, with a tolerance, faults by comparisons associated with parameter data of corresponding data of platforms in a redundant platform architecture.

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle. As a result, such vehicles use multiple computing platforms to perform these sensing activities. Diagnostic tests are typically performed by comparing the same data from these multiple computing platforms. this form of comparison can lead to false positives or false negatives in the diagnostic test detection results.

Accordingly, it is desirable to provide improved systems, methods and apparatuses for performing diagnostic tests with. It is further desirable to provide systems, methods, and apparatuses with improved tolerances such that false results are minimized. It is further desirable to provide systems, methods, and apparatuses for detecting and isolating faults that occur specifically in processors of vehicle systems. Furthermore, other desirable features and characteristics of the present invention will become apparent from the subsequent detailed description and the appended claims, taken in conjunction with the accompanying drawings and the foregoing technical field and background.

SUMMARY

Systems, methods and apparatuses are provided for detecting with a tolerance faults in processors and systems of a vehicle by comparisons associated with parameter data of corresponding data of platforms in a redundant platform architecture thereby minimizing false positive and false negative comparison results.

In embodiments, a system for detecting faults is provided. The system includes: a fault diagnostic computer in an autonomous vehicle configured to, via at least a first platform and a second platform, receive parameter data for processing simultaneously the parameter data in each platform wherein the first and second platforms are redundant configurations of each other wherein the parameter data includes a characteristic of a data; a check platform, coupled to the first and second platforms, for performing a method for checking the parameter data processed by both platforms using a collision test, the method includes: detecting, by applications of the collision test to one or more corresponding data found on each platform, collisions of the data within a tolerance prescribed by the collision test; and determining faults, in either the first platform, the second platform or both, based on results of comparisons of the parameter data of the detected collisions of the one of more corresponding data found on each platform.

In embodiments, the system includes: a first path and a first environment configured to via the first platform enable the checking of the parameter data found on the first platform by the check platform.

In embodiments, the system includes: a second path and a second environment configured to via the second platform enable the checking of the parameter data found on the second platform by the check platform. The first platform includes a processor and a hardware accelerator. The second platform includes a processor and a hardware accelerator. The check platform includes a first check platform for checking parameter data of the first platform. The check platform includes a second check platform for checking parameter data of the second platform.

In embodiments, in the system, the method further includes: determining faults in either or both platforms based on a result of a collision test result of either a collision free state or collision detected state. The parameter data that has been received is from processors of the autonomous vehicle containing the fault diagnosis computer wherein the fault is associated with a particular vehicle processor.

In another embodiment, a method for detecting faults is provided. The method includes: receiving parameter data by a fault diagnostic computer in an autonomous vehicle configured in at least a first platform and a second platform for processing simultaneously the parameter data in each platform wherein the first and second platforms are redundant configurations of each other wherein the parameter data includes a characteristic of a data; checking, by a check platform coupled to the first and second platforms, the parameter data processed by both platforms using a collision test; detecting, by applications of the collision test to one or more corresponding data found on each platform, collisions of the data within a tolerance prescribed by the collision test; and determining faults, in either the first platform, the second platform or both, based on results of comparisons of parameter data of the detected collisions of the corresponding data found on each platform.

In another embodiment, the method further includes: configuring the first platform in a first path and a first environment to enable the checking of the parameter data found on the first platform by the check platform.

In another embodiment, the method further includes: configuring the second platform in a second path and a second environment to enable the checking of the parameter data found on the second platform by the check platform. The first platform includes a processor and a hardware accelerator. The second platform includes a processor and a hardware accelerator. The check platform includes a first check platform for checking parameter data of the first platform. The check platform includes a second check platform for checking parameter data of the second platform.

In another embodiment, the method further includes: determining faults in either or both platforms based on a result of a collision test result of either a collision free state or collision detected state. The parameter data that has been received is from processors of autonomous vehicle containing the fault diagnosis computer wherein the fault is associated with a particular vehicle processor.

In another embodiment, an apparatus of an autonomous vehicle for detecting faults is provided. The apparatus includes: a fault diagnostic computer, within the autonomous vehicle configured in at least a first platform and a second platform, to receive parameter data to process simultaneously the parameter data in each platform wherein the first and second platforms are redundant configurations of each other wherein the parameter data includes a characteristic of a data; a check platform, coupled to the first and second platforms, for performing a method for checking the parameter data processed by both platforms using a collision test, the method includes: detecting, by applications of the collision test to one or more corresponding data found on each platform, collisions of the data within a tolerance prescribed by the collision test; and determining faults, in either the first platform, the second platform or both, based on results of comparisons of parameter data of the detected collisions of the corresponding data found on each platform.

In another embodiment, in the apparatus, the method further includes: isolating locations of faults by processors which have generated the parameter data to the fault diagnosis computer wherein the fault is associated with a particular vehicle processor.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, parameter flow, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

To achieve high level automation, vehicles are often equipped with an increasing number of different types of devices for analyzing the environment around the vehicle, such as, for example, cameras or other imaging devices capturing imagery of the environment, radar or other ranging devices for surveying or detecting features within the environment, and the like. In practice, the different onboard devices are located at different locations onboard the vehicle and typically operate at different sampling rates or refresh rates, and as a result, capture different types of data and parameters corresponding to different points in time from different viewpoints or perspectives.

The availability of automotive grade hardware accelerators for these sensors is at best limited and hence hardware accelerators and processors used in automotive sensors are derived from the consumer marketplace. With these non-automotive grade hardware accelerators and processors in particular while also in instances relevant to automotive grade hardware accelerators and processors, the integrity of these accelerators and processors when used in automotive sensors may not always be sufficient to meet the reliability necessitated for autonomous vehicle deployments. That is, it is not uncommon for such hardware accelerators and processors to have faults when used for autonomous vehicle operations.

Therefore, there is needed a convenient and precise way to detect and isolate faults, without high false positives or negative results in these processors, when operating the processors in autonomous vehicles. Further, the detection process is necessary not only during the autonomous vehicle operation but from the commencement or provisioning of autonomous activities to recognize and correct for processor failures prior to operations of the autonomous vehicle systems.

In various embodiments, a redundancy architecture may be used to achieve the goal of diagnosis coverage of fault detection, isolation or partial isolation of processor faults. In such instances, the fault detection and isolation may be achieved in a dual, if not more, redundant computing architecture that is tolerant to comparisons (e.g. asynchronicities of data) between the computers or processors operational steps and provides fault detection of hardware accelerators by performing a diagnostic test of comparisons of inputs and outputs of the parameter data and not the actual data itself between at least two redundant computing platforms.

The parameter data may include, but is not limited to, measurable factors forming one of a set that defines the data or data conditions during the data flow operation; quantities whose value is selected for the particular circumstances of the data flow and in relation to data flow which other variable quantities may be expressed; and/or physical properties whose values determine the characteristics or behavior of the data and data flow. It is contemplated that the parameter data is not considered to be the actual data per se for comparison purposes but characteristics of the data; however, the parameter data may also not be exclusive of the actual data and may include qualities or characteristics of the actual data. In other words, the parameter may be part of and not part of the actual data or a value prescribed to the actual data.

Figure 1:
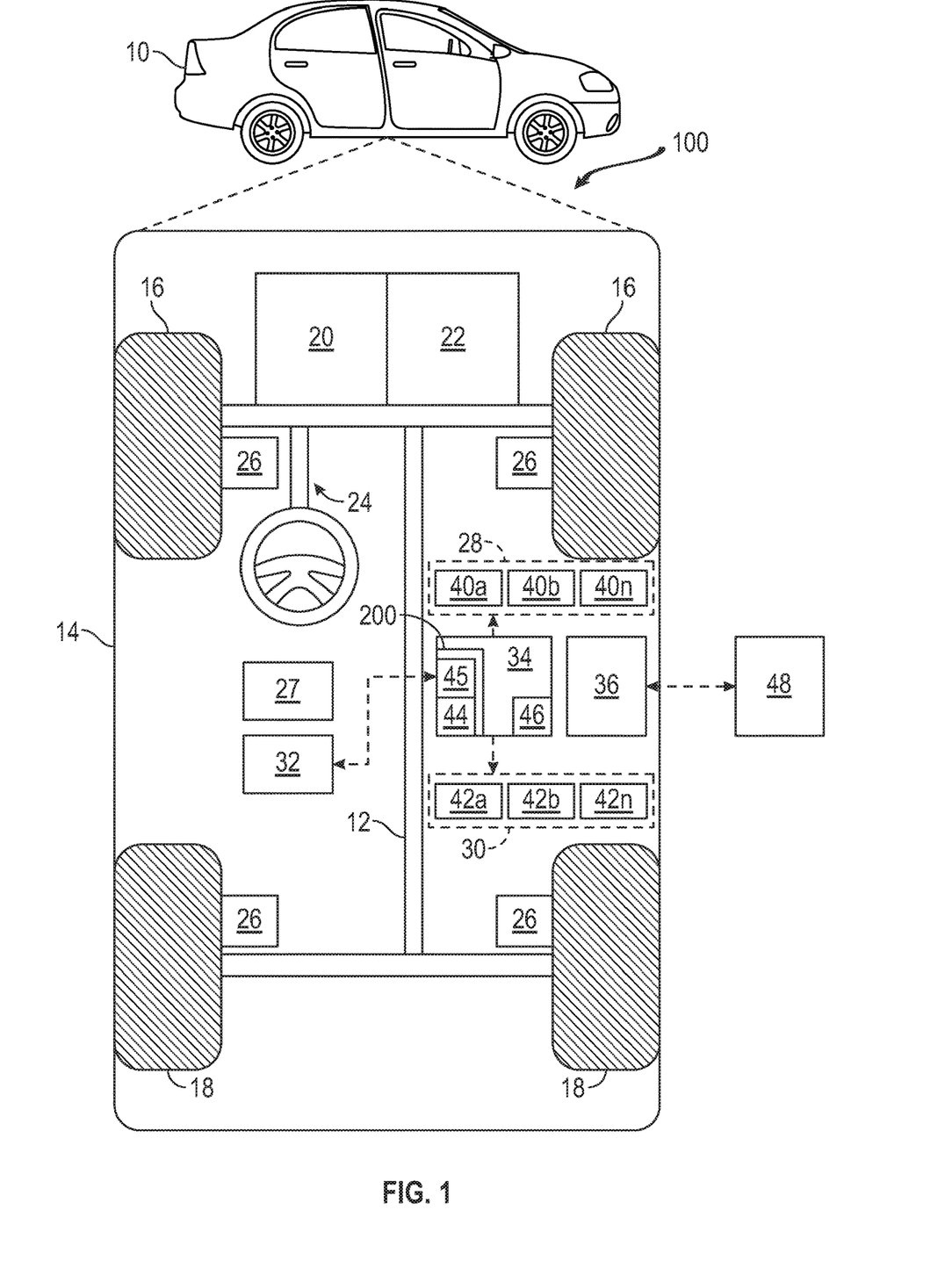
FIG. 1 is a functional block diagram illustrating a vehicle having a computer diagnostic detection system, in accordance with various embodiments.

With reference to FIG. 1, a vehicle system shown generally at 100 is associated with a vehicle 10 in accordance with various embodiments. In general, the vehicle system 100 includes a computer diagnostic system 200 configured with a redundant processor architecture to receive inputs and send outputs of feature detections from various processors and controls systems of the vehicle 10.

The present description primarily describes use of parameter data comparisons and not the data itself in a computer diagnostic system 200 in the context of diagnostic fault coverage for use in automotive systems, devices and applications. It should be understood, however, that the computer diagnostic systems 200 use of parameter data comparisons can be for detecting faults in a multitude of systems, devices and applications. The diagnostic tests or checks referred to includes a collision test with two inputs to make various checks and determinations of parameter data in paths, HW accelerators, processors and other components and systems. In addition, diagnostic tests or checks are not limited to collision tests.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the computer diagnostic system 200 is incorporated into the vehicle 10 (hereinafter referred to as the autonomous vehicle 10). The present description concentrates on an exemplary application in autonomous vehicle applications. It should be understood, however, that the computer diagnostic system 200 described herein is envisaged to be used in conventional and semi-autonomous automotive vehicles including driver assist systems, as an example, that make use of lane perception information, such as lane departure warning systems and lane-keeping assistance systems.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. In embodiments, the sensing devices 40a-40n include one or more cameras for obtaining images at a particular frame rate. The one or more cameras are mounted on the vehicle 10 and are arranged for capturing images of an exterior environment of the vehicle 10 (e.g. a sequence of images in the form of a video).

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes a redundant computer architecture of at least a processor 44 and a processor 45, were the processor 44 may be considered a primary processor and the processor 45 may be considered a backup processor. The processor 44 and the processor 45 are coupled to at least one computer readable storage device or media 46. The processor 44 and the processor 45 can be any custom made or commercially available processor, a central processing unit (CPU), a graphics processing unit (HW accelerator), an auxiliary processor among several processors associated with the controller 34, a semiconductor based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while both processors 44, 45 are powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processors 44 and the processor 45, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 4:
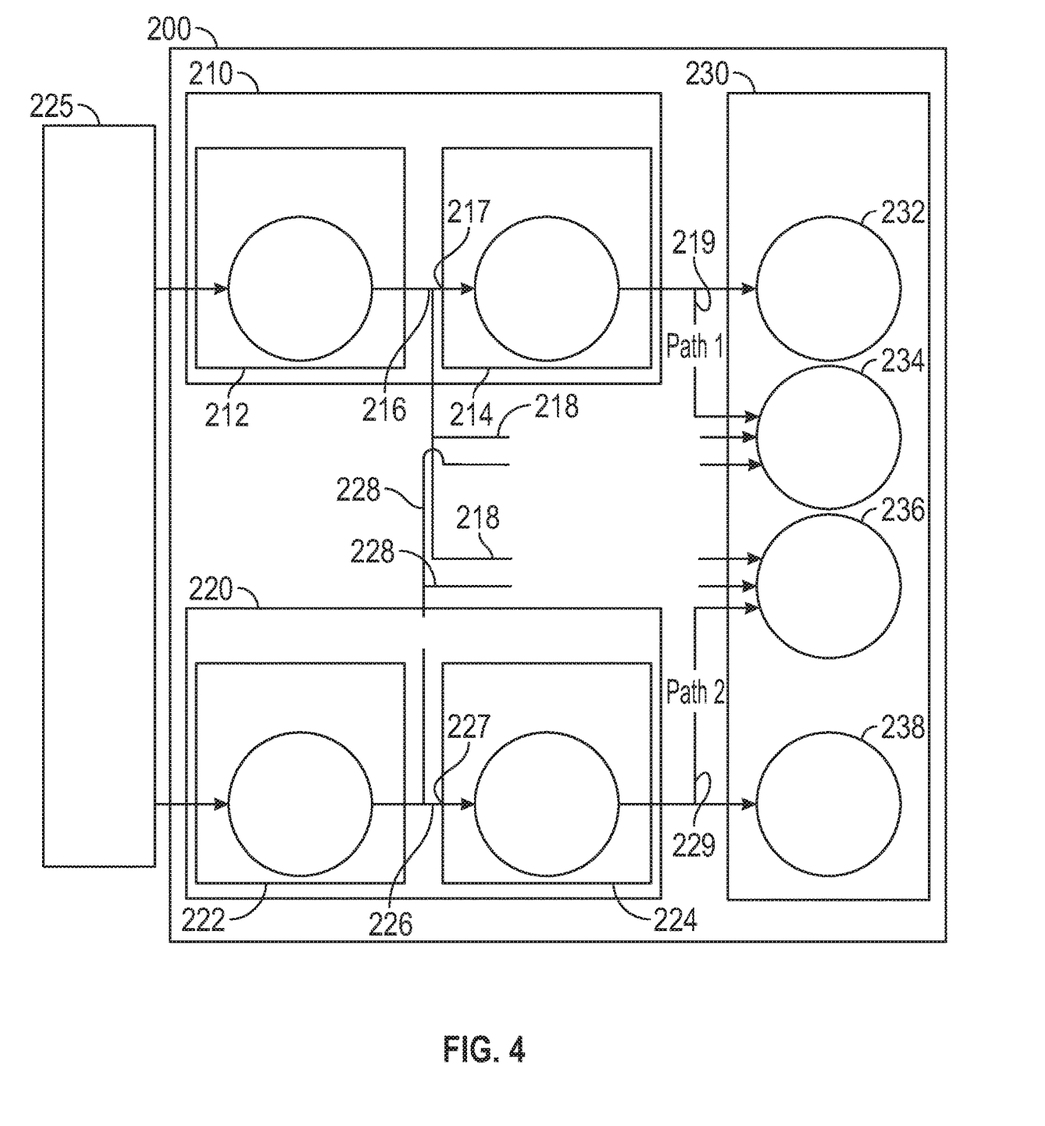
FIG. 4 is a parameter dataflow block diagram illustrating a computer diagnostic detection system, in accordance with various embodiments.

In various embodiments, and with reference to FIG. 4, one or more instructions of the controller 34 are embodied in the diagnostic computer system 200 and, when executed by the processors 44, 45 are configured to receive input data and input parameter data and produce output data and output parameter data for use by an automated feature of the vehicle 10.

Figure 2:
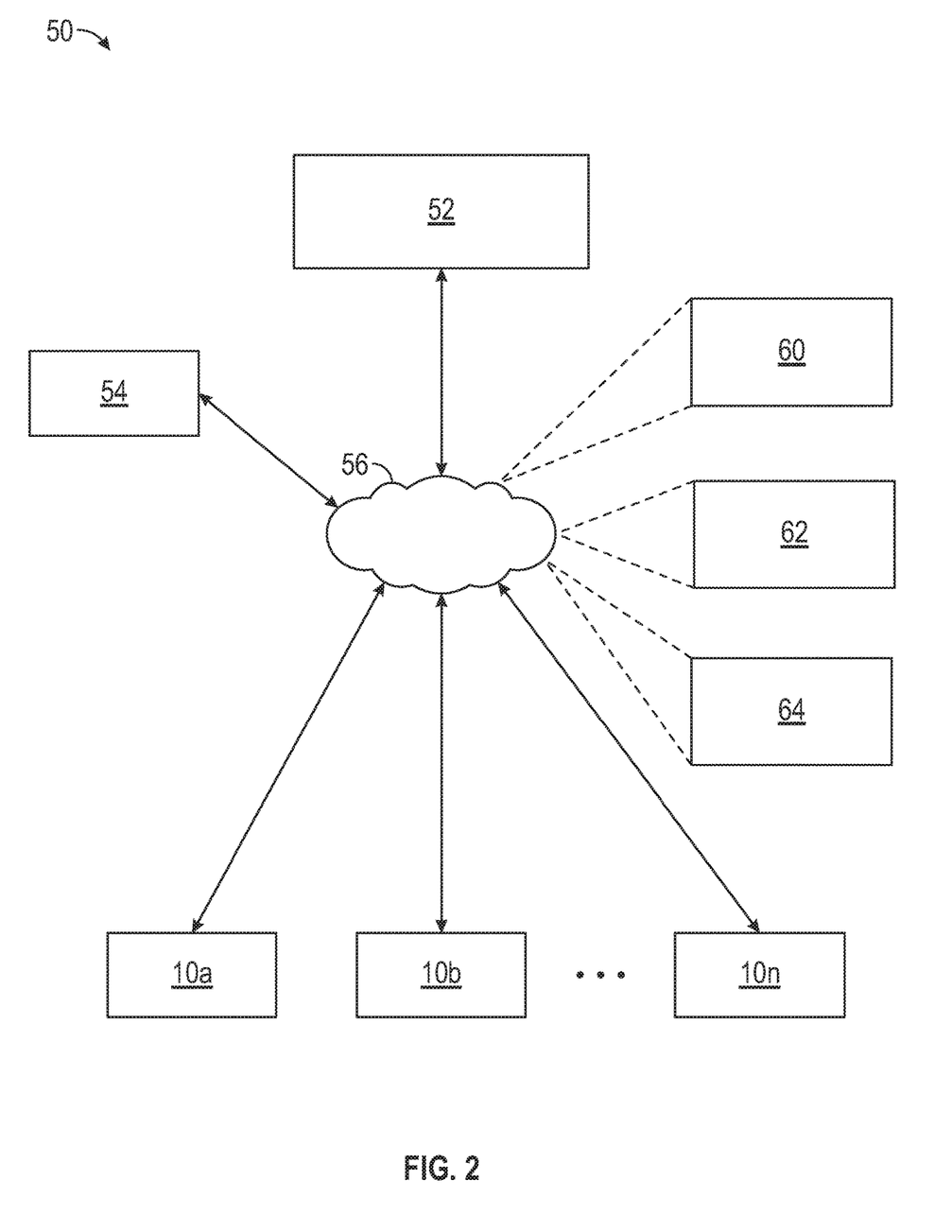
FIG. 2 is a functional block diagram illustrating a transportation system having one or more autonomous vehicles, in accordance with various embodiments

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

The subject matter described herein concerning the computer diagnostic system 200 is not just applicable to autonomous driving systems, devices and applications, but also other driving systems having one or more automated features utilizing computer capabilities. Further, the computer diagnostic system 200 is operable in other systems, devices and applications than the automotive sphere for fault detection and fault isolation.

Figure 3:
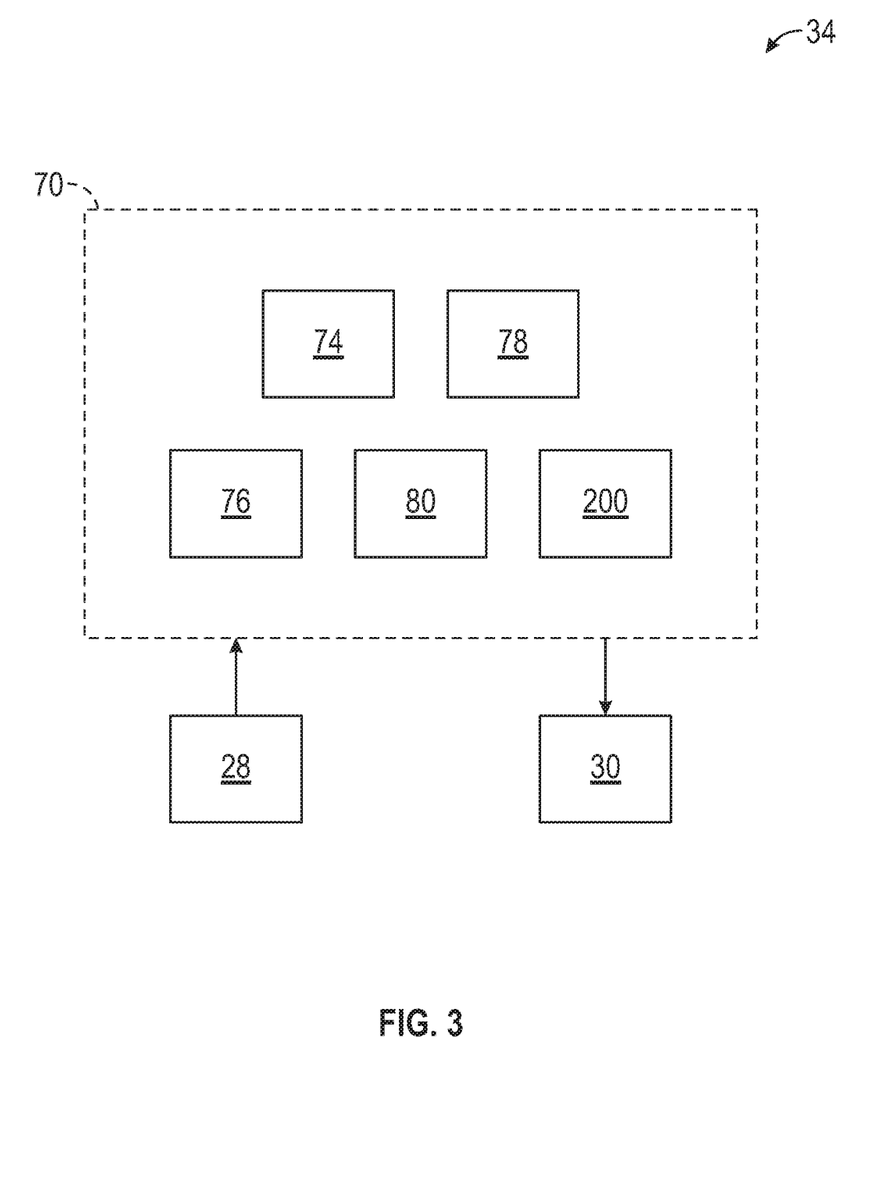
FIG. 3 is a parameter dataflow diagram illustrating an autonomous driving system that includes a computer diagnostic detection system in an autonomous vehicle, in accordance with various embodiments.

In accordance with an exemplary autonomous driving application, the controller 34 implements an autonomous driving system (ADS) 70 as shown in FIG. 3. That is, suitable software and/or hardware components of the controller 34 (e.g., the processors 44, 45 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the computer diagnostic system 200 of FIG. 1 (and FIG. 4) may be included within the ADS 70 in autonomous driving systems and applications, for example, as part of the computer diagnostic system 200 fault detection and isolation capabilities. The computer diagnostic system 200 is configured to output parameter data for use in various possible automated control modules that rely on feature detection such as image feature classification and localization. In some embodiments, the detected image features parameter data includes road feature parameter data (such as road boundaries and road markings including road side signs and traffic lights) including lane feature parameter data (such as lane boundaries and lane markings) and surrounding objects parameter data (including pedestrians, other vehicles, buildings, etc.). Such detected image features parameter data is utilizable by the guidance system 78 to determine upon a trajectory for the vehicle 10. The vehicle control system 80 works with actuator system 30 to traverse such a trajectory.

Figure 5A:
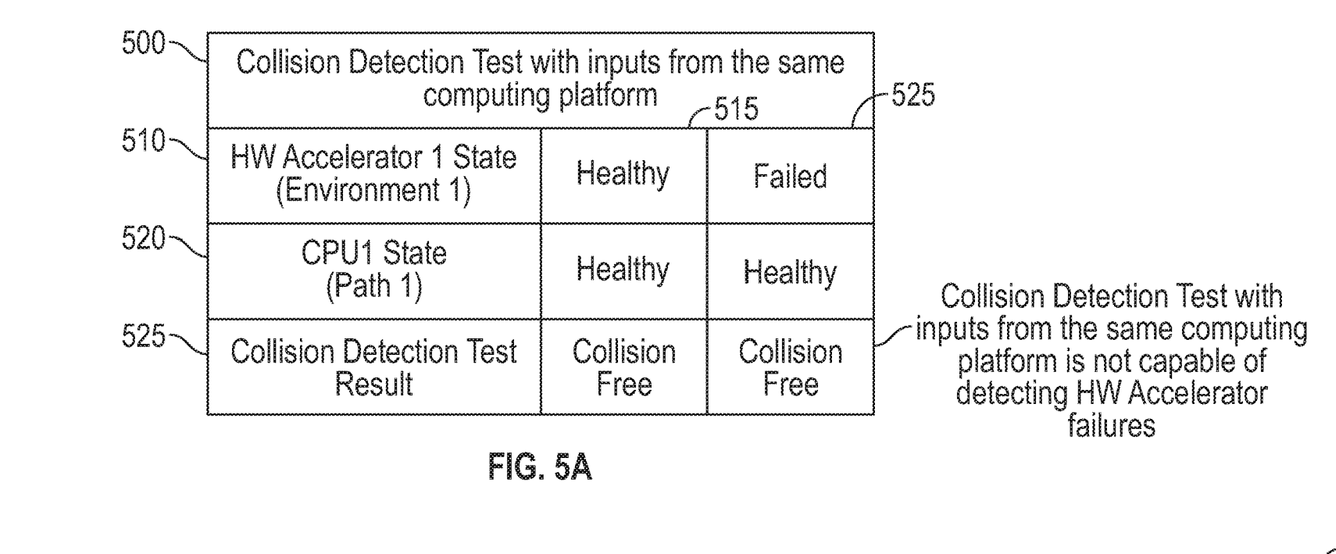
FIGS. 5A and 5B illustrates tables of various path checking by collision detection tests of the computer diagnostic detection system, in accordance with various embodiments.
Figure 5B:
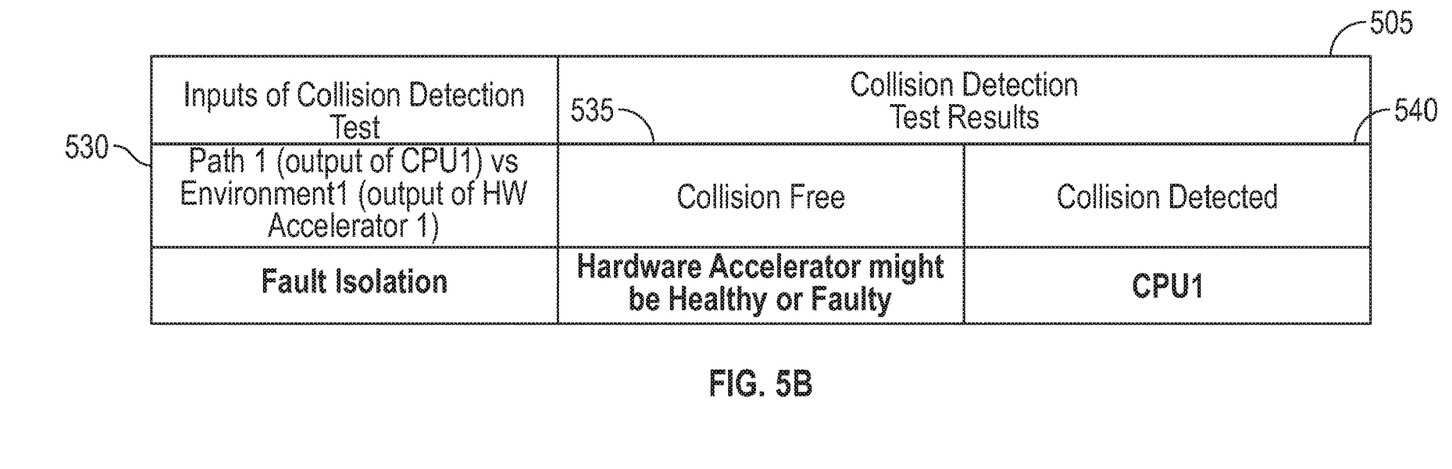

For example, as shown in more detail with regard to FIG. 4, and with continued reference to FIGS. 1 to 3, the computer diagnostic system 200 includes a primary compute platform 210 and a backup compute platform 222, each compute platform receives input parameter data from one or more of the sensor devices 225. In an exemplary embodiment, input parameter data from the one or more sensor devices 225 (e.g. optical camera 40a-40n of FIG. 1) is received by both the primary compute platform 210 and the backup compute platform 220. In more detail, an exemplary diagnostic path check of the computer diagnostic system 200 is illustrated in FIG. 5. It should be appreciated that FIG. 5 illustrates one technique of path checking for fault detection and fault isolation of the input and output parameter data. Other fault detection and fault isolation techniques are used in alternative embodiments, which provide path checks of input and output parameter data for determining isolated or partially isolated component failures.

Referring back to FIG. 4, in an exemplary embodiment, the parameter data is processed, via a dual path arrangement of the parameter flow, by a primary hardware accelerator 212 and by a backup hardware accelerator 222. The processing by the primary hardware accelerator 212 and the backup hardware accelerator 222 in a normal operation would occur within a relatively same or similar time frame or cycle time. That is, the primary hardware accelerator 212 and the backup hardware accelerator 222 would receive the data with the parameter data within a processor cycle, or prescribed window or range. Further, the timing cycles may be changed or modified by design; that is a normal operation may be considered in a single period or within multiple periods. Latency times may be designed, changed and updated depending on operational needs and processing capabilities in the pipeline. Likewise, as the dual path parameter data flow continues at the output 216 and input 217 on path 1 (or trajectory calculated by internal solutions in the CPU) to the primary processor 214 the parameter data flow may be within sync, nearly within sync, or within a time period range of the redundant path in path 2 of parameter flow at the output 226 and the input 227 to the backup processor 224. The parameter flow continues, in a dual bypass path of the primary processor 214 via a first environment in path 1 shown by 218, and of the backup processor 224 via a second environment in a redundant bypass path in a path 2 shown by 228.

At a primary path check module 234, the primary path check 1 module 234 receives three inputs of a first input: the parameter data flow output from the primary processor 214 by path 1 shown by 219; a second input: the parameter data flow output from the backup hardware accelerator 222 by path 2; and a third input: the parameter data flow output from the primary hardware accelerator 212 in path 1 shown by 218.

At the backup path check 2 module 236, the backup path check 2 module receives likewise three inputs: the first input: the parameter data flow output from the backup processor 220 by path 2 shown by 229; the second input: the parameter data from the parameter data flow output from the primary hardware accelerator 212 in path 1 shown by 218; and the third input: the parameter data flow output from the backup hardware accelerator 222 in path 2 shown by 228.

The primary command computation module 232 receives input of the parameter data flow by path 1 from the output of the primary processor 214 shown by 219. The backup command computation module 238 receives input of the parameter data flow by path 2 from the output of the backup processor 214 shown by 229.

The primary processor 214 performs functions related to motion planning and the backup processor 224 performs the same functions related to motion planning. The primary hardware accelerator 212 performs functions related to perception and the backup hardware accelerator 222 performs same functions related to perception.

Failure detection is achieved by running a collision detection test via laying the path (calculated in the processors) over the environment (calculated in the hardware accelerator). Running collision check with both inputs from the same compute platform allows for a check to determine processor failures. Hence collision tests are used on inputs from both compute platforms and utilize parameters that are tolerant to imperfections in time synchronization across computing platforms. Directly comparing the same data from multiple computers to detect failures is prone to false positive detections due to the data being out of sync, hence utilizing parameters that are associated with the data and are more robust against synchronization issues results in less false positive detections, which in turn, provides diagnostic coverage that is more robust.

FIGS. 5A and 5B illustrates the type of results for performing collision detection testing with inputs from the same platform in accordance with an exemplary embodiment. In FIG. 5A, the basic path check results in a series of collision tests are indicated in the collision detection table 500 by states of "healthy", "failed", "pass" or "fail". In the collision detection table 500, in row 510, the primary hardware accelerator 212 of FIG. 4 illustrates the results of a path checker/collision detection test with both inputs (path and environment) from the same computing platform/controller in row 510 where the results in the first test: "healthy"; in the second test: "failed". That is, in the second column 515 if the HW accelerator is "healthy" at row 510 or fault free and the CPU1 is fault free or "healthy" at row 520, the path checker/collision detection test result in row 525 would not detect any collisions (shown in column 515) and would operate on the assumption that the all the modules are "healthy" or fault free.

In the third column 525 and in row 520, the primary processor 214 of FIG. 4 is checked and the results are in a first test: "healthy"; in a second test: "healthy". In the third column 525, there is illustrated if the CPU1 is "healthy" (fault free) but the HW accelerator 1 is faulty; the path checker does not detect a collision when performing a collision test on path 1 (output of CPU1) vs Environment 1 (output of HW Accelerator) therefore will not be able to detect a failure. Hence, the requirement of a redundant comparison check using a path 2 check (illustrated in FIG. 6). Hence, in this instance, even though there is a faulty HW accelerator, the basic path checker does not detect this failure without the additional comparison check on path 2. That is, to detect this fault, it is necessary to perform a collision check on Path 1 vs Environment 2 and Path 2 vs Environment 1 as illustrated in FIG. 6.

In the collision detection table of FIG. 5B, in the fourth column 505, there is illustrated if the HW accelerator 1 is healthy (fault free) 525 but the CPU1 is faulty; the path checker will detect a collision 540 when performing a collision test on path 1 (output of CPU1) vs Environment 1 (output of HW accelerator 1) of row 530. This can be considered a desirable outcome since a diagnostic test (path checker/collision test) is able to detect failures in CPU1.

The motion planning function in a healthy (fault free) CPU will plan a collision free path (trajectory) with regards to the input (which is a perceived environment from HW accelerator). In other words, even if the perceived environment is faulty or is faulty due to a failure in HW accelerator, the output of motion planning in CPU will still be in a state of a collision free when compared to the perception of the environment as the perception of the environment in such instances would not be correct. In other words, the perceived environment would be healthy when in fact it is faulty and the CPU planned path would over-ride the faulty perception.

Figure 6:
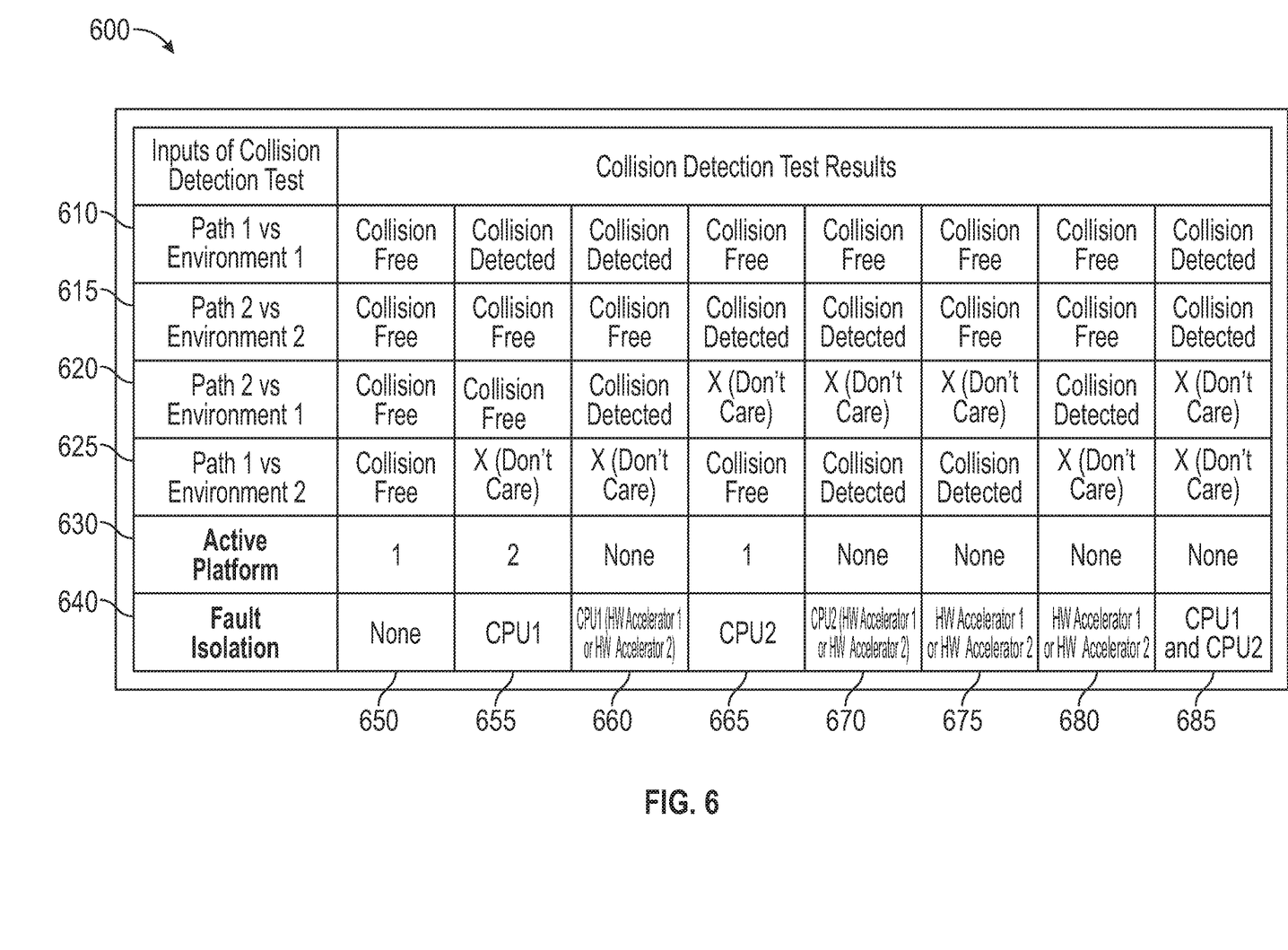
FIG. 6 illustrates a table of various collision test results of the computer diagnostic detection system, in accordance with various embodiments.

In FIG. 6 an exemplary embodiment of results of diagnostic checks by the computer diagnostic system of FIGS. 1-4 is illustrated in the diagnostic check table 600. The diagnostic check table illustrates various scenarios for collision testing and comparison results. The scenarios are as follows: in row 610: path 1 vs. environment 1; in row 615: path 2 versus environment 2: in row 620: path 2 versus environment 1; in row 625: path 1 versus environment 2; in row 630 the active platform results; and in row 640: the fault isolation results.

In an exemplary embodiment, the active platform is identified as platform "1" and there is no fault isolation identified in column 650 when the following conditions are met: in row 610, the result of collision detection test on path 1 versus environment 1 is "Collision Free"; in row 615, the result of collision detection test on path 2 versus environment 2 is "Collision Free"; in row 620, the result of collision detection test on path 2 versus environment 1 is "Collision Free"; in row 625, the result of collision detection test on path 1 versus environment 2 is "Collision Free". As all the collision checks have passed, either platform 1 or 2 may be used. However, platform 1 is assumed to be primary platform and therefore treated as active platform. In column 650, the fault isolation of "none" and active platform of "Platform 1" may be represent by: IF [(Collision Detection Test (Path1, Environment1)=Collision Free) AND (Collision Detection Test (Path2, Environment2)=Collision Free) AND (Collision Detection Test (Path2, Environment1)=Collision Free) AND (Collision Detection Test (Path1, Environment2)=Collision Free)] THEN Active Platform=Platform 1and the Fault Isolation=None.

In another exemplary embodiment, the active platform is identified as platform "2" and the fault isolation identified as CPU1 in column 655 when the following conditions are met: in row 610, the result of collision detection test on path 1 versus environment 1 is "Collision Detected"; in row 615, the result of collision detection test on path 2 versus environment 2 is "Collision Free"; in row 620, the result of collision detection test on path 2 versus environment 1 is "Collision Free"; in row 625, the result of collision detection test on path 1 versus environment 2 is "X" which indicates that the result is irrespective the result of the collision detection test of either a "Collision Free" or "Collision Detected" state. When a "Collision Detected" states is determined result of path 1 versus environment 1, the collision test indicates that CPU1 is faulty; hence, by virtue of this detection of a fault in the CPU1, there is no need to run the collision test with path 1 (which is the output of faulty CPU1) and environment 2. In addition, as the results of the collision detection test on path 2 vs environment 2 as well as path 2 vs environment 1 are determined to be "Collision Free"; it can be ascertained that there is no failure detected in the CPU2 or either of the Hardware Accelerators (1 or 2). Furthermore, since CPU2 and the Hardware Accelerator 2 are both determined to be in a fault free states, the platform 2 is then the "Active Platform". In column 655, the fault isolation of "CPU1" and the active platform state of "Platform 2" may be represented by the following logical relationship: IF [(Collision Detection Test (Path1, Environment1)=Collision Detected) AND (Collision Detection Test (Path2, Environment2)=Collision Free) AND (Collision Detection Test (Path2, Environment1)=Collision Free)] THEN Active Platform=Platform 2 and the Fault Isolation=CPU1.

In another exemplary embodiment, when the active platform is identified as "none" and the fault isolation is identified as CPU1 and (Hardware Accelerator 1 OR Hardware Accelerator 2) in column 660 then the following conditions are met: in row 610, the result of the collision detection test on path 1 versus environment 1 is "Collision Detected"; in row 615, the result of the collision detection test on path 2 versus environment 2 is "Collision Free"; in row 620, the result of the collision detection test on path 2 versus environment 1 is "Collision Detected"; in row 625, the result of collision detection test on path 1 versus environment 2 is "X". Since the results of collision detection test on path 2 vs environment 1 is "Collision Detected" there is a failure detected on one of Hardware Accelerators (1 or 2). In column 660, the fault isolation of "CPU1 and (Hardware Accelerator 1 OR Hardware Accelerator 2)" and active platform of "none" may be represent by the following logic relationship: IF [(Collision Detection Test (Path1, Environment1)=Collision Detected) AND (Collision Detection Test (Path2, Environment2)=Collision Free) AND (Collision Detection Test (Path2, Environment1)=Collision Detected)] THEN Active Platform=None and the Fault Isolation=CPU1 AND (Hardware Accelerator 1 OR Hardware Accelerator 2).

In another exemplary embodiment, the active platform is identified as platform "1" and the fault isolation identified in CPU2 in column 665 when the following conditions are met: in row 610, the result of the collision detection test on path 1 versus environment 1 is a "Collision Free" result; in row 615, the result of the collision detection test on path 2 versus environment 2 is a "Collision detected"; in row 620, the result of the collision detection test on path 2 versus environment 1 is "X"; in row 625, the result of collision detection test on path 1 versus environment 2 is "Collision Free". Path 2 versus environment 2, failure indicates that path 2 is faulted and the test on path 2 vs environment 1 will be not necessary to identify a failure i.e. in the CPU2 in this particular case. In column 665, the fault isolation of "CPU2" and active platform of "Platform 1" may be represented by the logic relationship as follows: IF [(Collision Detection Test (Path1, Environment1)=Collision Free) AND (Collision Detection Test (Path2, Environment2)=Collision Detected) AND (Collision Detection Test (Path1, Environment2)=Collision Free)] THEN Active Platform=Platform 1 and the Fault Isolation=CPU2.

In column 670, a fault isolation of "CPU2 and (Hardware Accelerator 1 OR Hardware Accelerator 2)" and an active platform of "none" may be represented by the logic relationship as follows: IF [(Collision Detection Test (Path1, Environment1)=Collision Free) AND (Collision Detection Test (Path2, Environment2)=Collision Detected) AND (Collision Detection Test (Path1, Environment2)=Collision Detected)] THEN Active Platform=None and the Fault Isolation=CPU2 AND (Hardware Accelerator 1 OR Hardware Accelerator 2).

If the fault isolation is found in HW accelerator 1 or HW accelerator 2 in column 675, the fault isolation and the active platform may be represented by logic relationship as follows: IF [(Collision Detection Test (Path1, Environment1)=Collision Free) AND (Collision Detection Test (Path2, Environment2)=Collision Free) AND (Collision Detection Test (Path1, Environment2)=Collision Detected)] THEN Active Platform=None Fault Isolation=HW Accelerator 1 OR HW Accelerator 2.

If the fault isolation is in HW accelerator 1 or HW accelerator 2 in column 680, the fault isolation and active platform may be represented by the logic relationship as follows: IF [(Collision Detection Test (Path1, Environment1)=Collision Free) AND (Collision Detection Test (Path2, Environment2)=Collision Free) AND (Collision Detection Test (Path2, Environment1)=Collision Detected)] THEN Active Platform=None Fault Isolation=HW Accelerator 1 OR HW Accelerator 2.

If the fault isolation is in CPU1 and CPU2 in column 685, the fault isolation and active platform may be represented by the logic relationship as follows: IF [(Collision Detection Test (Path1, Environment1)=Collision Detected) AND (Collision Detection Test (Path2, Environment2)=Collision Detected)] THEN Active Platform=None, Fault Isolation=CPU1 AND CPU2.

In various exemplary embodiments in table 600 there is shown different states of the active platform, fault isolation for comparisons of paths 1 and 2, and environments 1 and 2 for the primary and backup processor.

Figure 7:
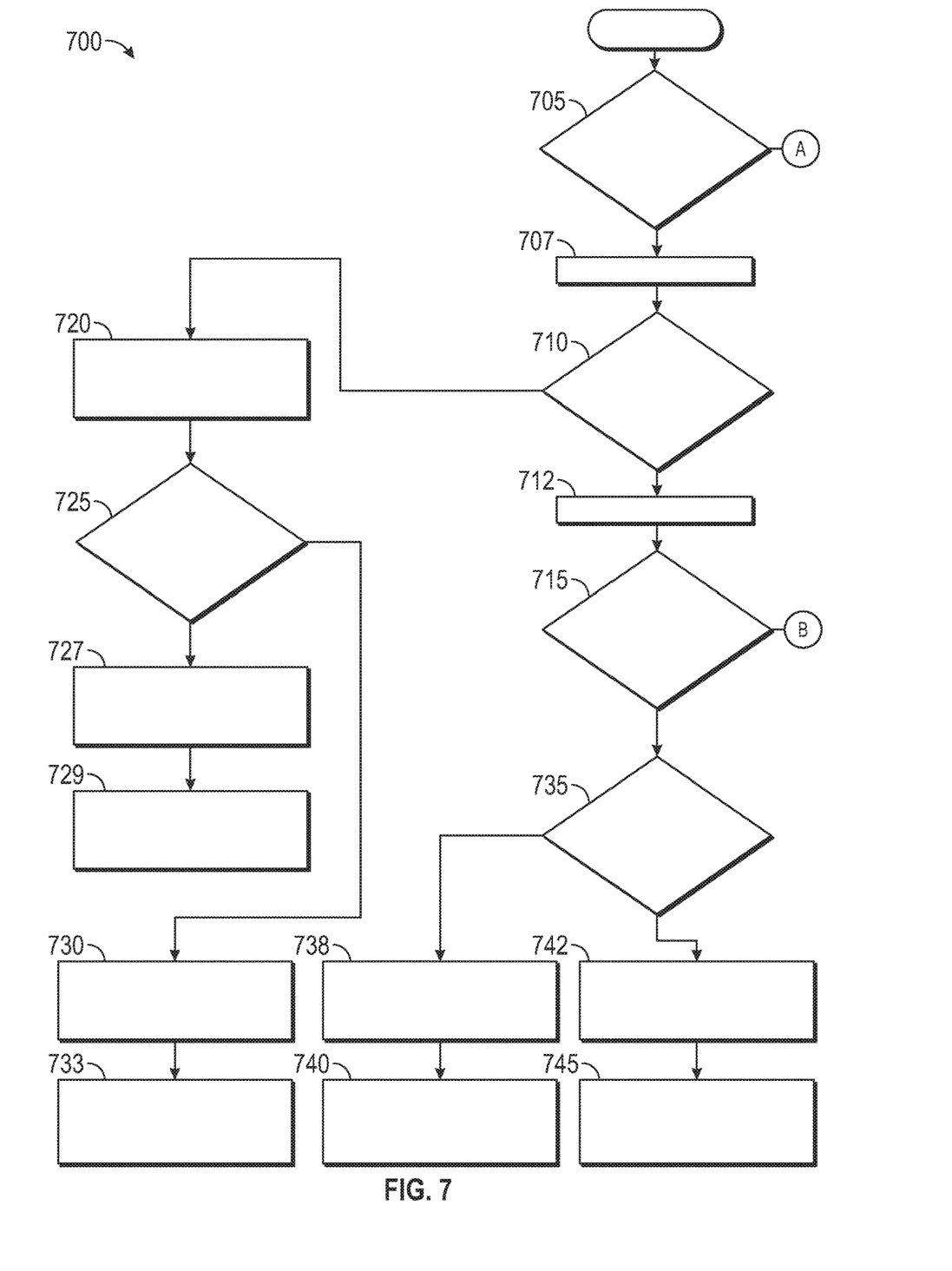
FIG. 7 is a flowchart illustrating a computer diagnostic detection method for use in an autonomous or semi-autonomous vehicle, in accordance with various embodiments.
Figure 8:
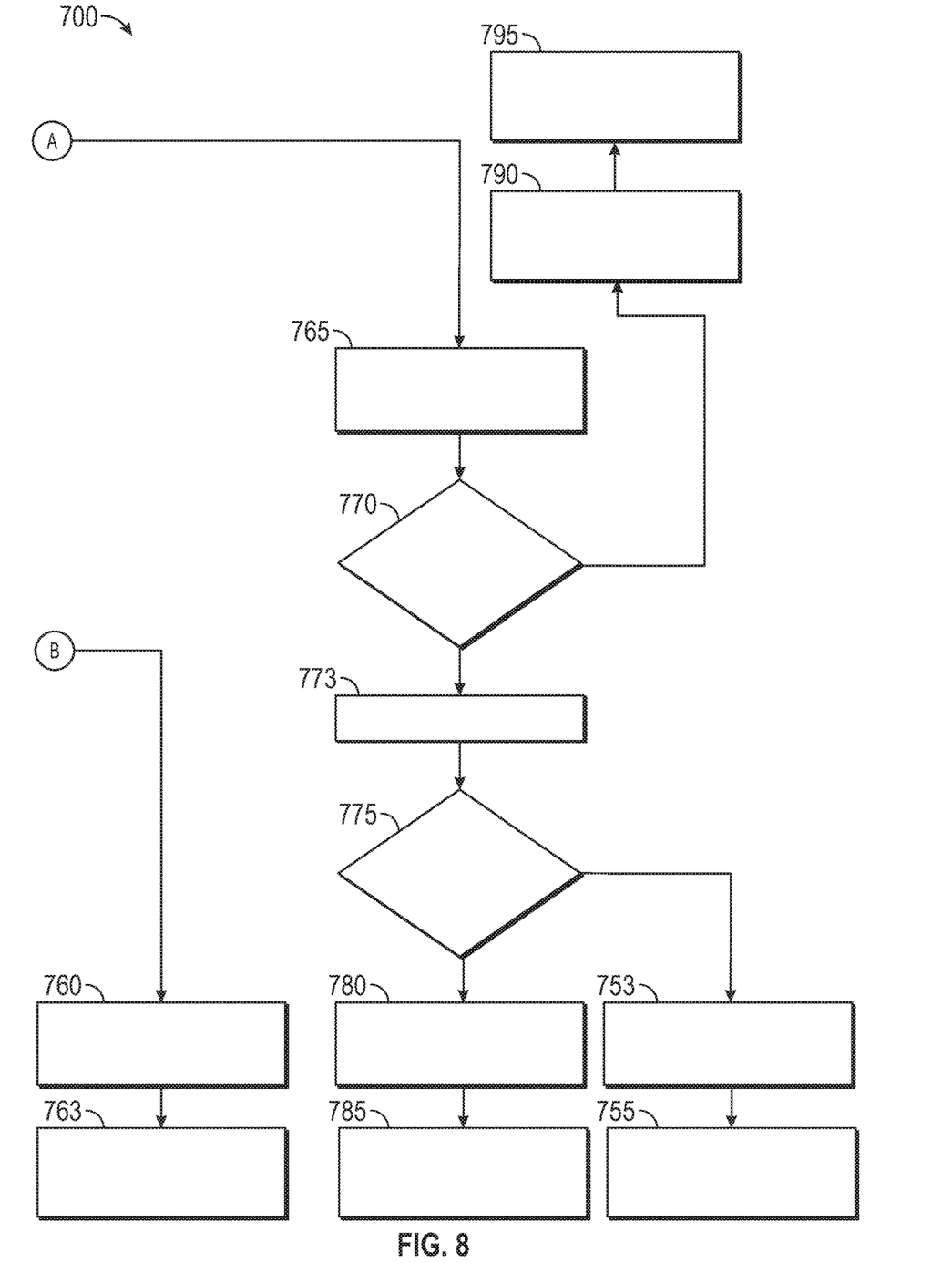
FIG. 8 is a flowchart illustrating a computer diagnostic detection method for use in an autonomous or semi-autonomous vehicle, in accordance with various embodiments.

Referring now to FIGS. 7 and 8, and with continued reference to FIGS. 1-6, a flowchart illustrates a diagnostic fault method 700 that can be performed by the diagnostic detection system 200 of FIG. 4 in accordance with the present disclosure. As can be appreciated in light of the disclosure, the order of operation within the method is not limited to the sequential execution as illustrated in FIGS. 7 and 8, but may be performed in one or more varying orders as applicable and in accordance with the present disclosure. In various embodiments, the method 700 can be scheduled to run based on one or more predetermined events, and/or can run continuously during operation of the semi-autonomous or autonomous vehicle 10 or during operation of some other applications.

The collision test of the computer diagnostic system 200 of FIGS. 1-6 uses the formula for calculation of headway of the parameter data, as follows:

$$\text{Headway} = (D_h - D_t) \quad (1)$$

$$D = V^2/(2*\mu*g) \quad (2)$$

$$D=\text{Stopping Distance}, V=\text{Velocity}, \mu=\text{surface coefficient}, g=\text{Deceleration} \quad (3)$$

If the headway is outside a prescribed range or threshold then a "Collision Detected" result occurs. If the headway is inside or within a prescribed range or threshold then a "Collision Free" result occurs. The headway calculation provides a tolerance of an "in sync" parameter data on the respective paths and environment. The headway calculation provides a particular calculation for determining when the parameter data is out of sync when compared in the respective paths. The headway calculation can be modified or changed if there is deemed to many false positives or negatives for a particular redundant processor architecture configuration.

In FIGS. 7 and 8, at task 705, a comparison by the collision detection test of parameter data of path 1 and environment 1 (illustrated in FIG. 4) is performed by the computer diagnostic system 200 of FIG. 1. If there is no collision detected of the parameter data the flow proceeds to the next determination task. If a collision is detected at task 705, the collision detection result is a "Collision Detected". Since, the output and input are from primary processor 214, a determination can be made that the primary processor 214 (CPU1) has a fault. Hence, the path check result in the table 600 of FIG. 6 including a fault isolation in the primary processor 214 (CPU1). If no collision is found at task 705, the state of primary processor 214 (CPU1) of FIG. 4 is identified as fault free at task 707 (i.e. no failure detected in CPU1) and the flow proceeds to the next diagnostic check of task 710.

At task 710, a comparison by the collision detection test of parameter data of path 2 and environment 2 (illustrated in FIG. 4) is performed by the computer diagnostic system 200 of FIG. 1. If there is no collision detected of the parameter data, the status of CPU2 is determined "fault free" at task 712 (i.e. no fault detected in CPU2) and the flow proceeds to the next determination to task 715. If a collision is detected at task 710, a failure of the backup processor 224 (CPU2) is detected.

A secondary diagnostic check is then performed at task 725. That is, at task 725, a comparison by the collision detection test of parameter data of path 1 and environment 2 (illustrated in FIG. 4) is performed by the computer diagnostic system 200 of FIG. 1. At this stage, if no collision a no fault is detected by task 727 for the primary processor 214 (CPU1) and for primary hardware accelerator 212 (HW accelerator 1) and shown in table 600. That is, at task 729 it is determined that platform 1 is fault free and can be used as the active platform for controlling the vehicle. Alternately, if at task 725, a collision is detected by the comparison by the collision detection test of parameter data of path 1 and environment 2, then the fault or failure of the primary hardware accelerator 212 (HW accelerator 1) or the backup hardware accelerator 222 (HW accelerator 1) is detected at task 730. Further, it is also determined at task 733 that neither platform 1 nor platform 2 should be used as active platform for controlling the vehicle.

At task 710, if the platform is collision free and no fault is detected and determined in the CPU2 at 712, then at this stage the flow proceeds to another diagnostic fault test. At task 715, a comparison by the collision detection test of parameter data of path 1 and environment 2 (illustrated in FIG. 4) is performed by the computer diagnostic system 200 of FIG. 1. At task 715, if there is no collision detected of the parameter data, the status of platform at this stage is determined "collision free" and the flow proceeds to the next determination to task 735.

At task 735, a comparison by the collision detection test of path 2 and environment 1 is performed. If a collision is detected, then at task 738 a failure is detected in the hardware accelerator 212 (HW accelerator 1) or the hardware accelerator 222 (HW accelerator 2). Next, the flow proceeds to task 740, and both platform are determined to be fault free and can be used for controlling the vehicle. At task 735, if no collision is detected then at task 742 no fault is detected on the primary processor 214 and backup processors 224, or the primary hardware accelerator 212 (HW accelerator 1) and backup hardware accelerator (HW accelerator 2). Next, at task 745, both platform are determined to be fault free and can be used for controlling the vehicle. At task 715, if a collision is detected, than the flow proceeds to task 760 (in FIG. 8) and a fault or failure is determined in the hardware accelerator 212 (HW accelerator 1) or the hardware accelerator 222 (HW accelerator 2). Then, proceeding to task 763, it is determined that neither platform should be used for controlling the vehicle.

The input data parameter to the backup processor 224 via environment 2 of FIG. 4 and the output data parameter of the backup processor 224 on path 2 are not in sync by a result of the collision test between the data parameters from the input side and the output side. That is, the headway of each of the data parameters is deemed outside a valid range or tolerance. Since, the output and input are from backup processor 224, a determination can be made that the backup processor 224 (CPU2) has a fault. Hence, the path check result in the table 600 of FIG. 6 shows a fault isolation in the backup processor 224 (CPU2).

At task 705, if a collision is detected then the flow proceeds to task 765 (in FIG. 8) and a failure is detected in the primary processor 214 (CPU1) of FIG. 4. At task 770, a diagnostic fault test is applied of a comparison of path 2 and environment 1 by the collision test. If the test results in a collision free detection, the flow proceeds to task 773 were a failure is detected in the primary hardware accelerator 212 (HW accelerator 1) or the backup hardware accelerator 222 (HW accelerator 2).

Next the flow proceeds to task 775 and a diagnostic fault test is applied of a comparison of path 2 and environment 1 by the collision test. If path 2 is identified as collision free. Alternately, if at task 770, a collision is detected, the flow proceeds to task 780, were no fault or failure is detected in the primary hardware accelerator 212 (HW accelerator 1) or the backup hardware accelerator 222 (HW accelerator 2) at task 780. Next, at task 785 a determination that platform 2 is fault free and should be used for controlling the vehicle.

Alternatively, at task 775 if the diagnostic fault test of the comparison of path 2 and environment 1 yields a result of a collision detected then the flow proceeds to task 753. At task 753, a fault is determined in HW accelerator 1 or the HW accelerator 2. Hence, at task 755, it is determined that neither platform should be used in controlling the vehicle.

At task 770, if the diagnostic fault test of the comparison of path 2 and environment 1 yields a result of a collision detected then the flow proceeds to task 790. At task 790, a fault is determined in CPU2 and subsequently at task 795, it is determined that neither platform can be used for controlling the vehicle.

Although the present disclosure is directed to automotive applications in embodiments, other applications are envisaged whereby control is executed through perception that would utilize detected image features parameter data 210

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for detecting faults, the system comprising:
a fault diagnostic computer in an autonomous vehicle configured to, via at least a first platform and a second platform, receive parameter data for processing simultaneously the parameter data in each platform wherein the first and second platforms are redundant configurations of each other wherein the parameter data comprises a characteristic of a data;
a check platform, coupled to the first and second platforms, for performing a method for checking the parameter data processed by both platforms using a collision test, the method comprising:
detecting, by applications of the collision test to one or more corresponding data found on each platform, collisions of the data within a tolerance prescribed by the collision test; and
determining faults, in either the first platform, the second platform or both, based on results of comparisons of the parameter data of the detected collisions of the one of more corresponding data found on each platform.

2. The system of claim 1, further comprising:
a first path and a first environment configured to via the first platform enable the checking of the parameter data found on the first platform by the check platform.

3. The system of claim 2, comprising
a second path and a second environment configured to via the second platform enable the checking of the parameter data found on the second platform by the check platform.

4. The system of claim 3, wherein the second platform comprises a processor and a hardware accelerator.

5. The system of claim 2, wherein the first platform comprises a processor and a hardware accelerator.

6. The system of claim 1, wherein the check platform comprises a first check platform for checking parameter data of the first platform.

7. The system of claim 6, wherein the check platform comprises a second check platform for checking parameter data of the second platform.

8. The system of claim 1, the method further comprising:
determining faults in either or both platforms based on parameter data of a result of a collision test wherein the collision result determines either a collision free state or collision detected state.

9. The system of claim 1, wherein the parameter data that has been received is from processors of the autonomous vehicle containing the fault diagnostic computer wherein the fault is associated with a particular vehicle processor.

10. A method for detecting faults, the method comprising:
receiving parameter data by a fault diagnostic computer in an autonomous vehicle configured in at least a first platform and a second platform for processing simultaneously the parameter data in each platform wherein the first and second platforms are redundant configurations of each other wherein the parameter data comprises a characteristic of a data;
checking, by a check platform coupled to the first and second platforms, the parameter data processed by both platforms using a collision test;

detecting, by applications of the collision test to one or more corresponding data found on each platform, collisions of the data within a tolerance prescribed by the collision test; and determining faults, in either the first platform, the second platform or both, based on results of comparisons of parameter data of the detected collisions of the corresponding data found on each platform.

11. The method of claim 10, further comprising:
configuring the first platform in a first path and a first environment to enable the checking of the parameter data found on the first platform by the check platform.

12. The method of claim 11, further comprising
configuring the second platform in a second path and a second environment to enable the checking of the parameter data found on the second platform by the check platform.

13. The method of claim 12, wherein the second platform comprises a processor and a hardware accelerator.

14. The method of claim 11, wherein the first platform comprises a processor and a hardware accelerator.

15. The method of claim 10, wherein the check platform comprises a first check platform for checking parameter data of the first platform.

16. The method of claim 15, wherein the check platform comprises a second check platform for checking parameter data of the second platform.

17. The method of claim 10, further comprising:
determining faults in either or both platforms based on a result of a collision test result of either a collision free state or collision detected state.

18. The method of claim 10, wherein the parameter data that has been received is from processors of the autonomous vehicle containing the fault diagnostic computer wherein the fault is associated with a particular vehicle processor.

19. An apparatus of an autonomous vehicle for detecting faults, the apparatus comprising:
a fault diagnostic computer, within the autonomous vehicle configured in at least a first platform and a second platform, to receive parameter data to process simultaneously the parameter data in each platform wherein the first and second platforms are redundant configurations of each other wherein the parameter data comprises a characteristic of a data;
a check platform, coupled to the first and second platforms, for performing a method for checking the parameter data processed by both platforms using a collision test, the method comprising:
detecting, by applications of the collision test to one or more corresponding data found on each platform, collisions of the data within a tolerance prescribed by the collision test; and;
determining faults, in either the first platform, the second platform or both, based on results of comparisons of parameter data of the detected collisions of the corresponding data found on each platform.

20. The apparatus of claim 19, the method further comprising:
isolating locations of faults by processors which have generated the parameter data to the fault diagnostic computer wherein the fault is associated with a particular vehicle processor.

* * * * *